United States Patent
Wang et al.

(10) Patent No.: US 8,745,367 B2
(45) Date of Patent: Jun. 3, 2014

(54) ELECTRONIC SYSTEM, AND PREHEATING METHOD AND APPARATUS THEREOF

(75) Inventors: Chun-Chi Wang, Taipei (TW); Yi-Sheng Chueh, Taipei (TW); Che-Wei Chuang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 258 days.

(21) Appl. No.: 13/480,252

(22) Filed: May 24, 2012

(65) Prior Publication Data
US 2013/0100599 A1 Apr. 25, 2013

Related U.S. Application Data

(60) Provisional application No. 61/550,746, filed on Oct. 24, 2011.

(51) Int. Cl.
*G06F 9/00* (2006.01)
*G06F 11/00* (2006.01)
*G06F 15/177* (2006.01)

(52) U.S. Cl.
USPC .................. 713/2; 713/1; 714/36

(58) Field of Classification Search
CPC ... G06F 1/206; G06F 9/4401; G06F 11/1417; G06F 11/2284; H01L 23/345
USPC ............................ 713/1, 2; 714/36
See application file for complete search history.

(56) References Cited

U.S. PATENT DOCUMENTS

2009/0198387 A1* 8/2009 Lin et al. ............... 700/300
2012/0216026 A1* 8/2012 Chiu ...................... 713/2

FOREIGN PATENT DOCUMENTS

TW I244884 12/2005

OTHER PUBLICATIONS

U.S. Appl. No. 13/350,769, filed Jan. 14, 2012.
U.S. Appl. No. 13/397,307, filed Feb. 15, 2012.

* cited by examiner

*Primary Examiner* — Mark Connolly

(57) ABSTRACT

A method for preheating an electronic system when booting in an environment with low temperature and an apparatus using the same are provided. The electronic system includes at least a processor, at least a first controller, and at least a second controller. The method includes: the first controller checking whether the initialization of the second controller is successful or not after the electronic system boots, wherein the first controller include a basic input/output system; entering a preheating mode when the initialization of second controller has failed, wherein in the preheating mode, the processor is powered continuously and a turbo function is enabled, so as to provide a heat energy for heating the electronic system; and stopping the preheating mode and rebooting the electronic system.

20 Claims, 3 Drawing Sheets

ELECTRONIC SYSTEM, AND PREHEATING METHOD AND APPARATUS THEREOF

BACKGROUND OF THE INVENTION

1. Technical Field

The invention relates generally to an electronic system, and more particularly to a preheating method of the electronic system when booting in a low temperature environment and a preheating apparatus.

2. Related Art

A normal operating temperature of a typical electronic system, such as a notebook computer, ranges from 0° C. to 45° C. The electronic components in the electronic system, such as a hard disk, can operate directly within this normal temperature range. However, when the electronic system operates in an adverse environment, for example in a low temperature environment of −30° C., the internal components of the electronic system require a preheating operation in order for the electronic system to operate normally.

Accordingly, for low temperature booting, the computer system provides a system power to the heater through a battery in advance, such that the electronic system generates heat energy during the low temperature booting, thereby increasing the temperature of the electronic system to a normal booting temperature range. A basic input/output system (BIOS) is then executed to initialize the chipsets in the electronic system and complete the booting process.

However, the operable temperature ranges of the chipsets are not all the same. In the initialization process of the BIOS, comparatively lower quality chipsets would fail to initialize since the operable temperature has not been reached. And that causes issues such as a system crash or a boot failure. Additionally, using a normal power supply to increase the electronic system temperature requires a long wait time for booting.

SUMMARY OF THE INVENTION

The invention provides a method for preheating the electronic system when booting in an environment with low temperature, and a boot preheating apparatus. When the initialization of a system chipset has failed in the electronic system, a temperature ramping speed of the electronic system and the system chipset is increased. Moreover, the electronic system is rebooted, so as to effectively decrease the boot wait time needed for heating system chipset when booting in low temperature.

The invention provides a method for preheating an electronic system when booting in an environment with low temperature, the electronic system including at least one processor, at least one first controller, and at least one second controller. The method includes the first controller checking whether an initialization of the second controller is successful or not after the electronic system boots, in which the first controller includes a basic input/output system (BIOS); entering a preheating mode when the initialization of the second controller has failed, in which the processor is powered continuously and a turbo function is enabled in the preheating mode, so as to provide a heat energy for heating the electronic system; and stopping the preheating mode and rebooting the electronic system.

The invention provides a boot preheating apparatus of an electronic system in an environment with low temperature, the boot preheating apparatus including at least one processor, a power supply unit, at least one first controller, and at least one second controller. The power supply unit is coupled to the processor. The first controller is coupled to the power supply unit, and the first controller includes a BIOS. The second controller is coupled to the first controller. The first controller checks whether an initialization of the second controller is successful or not after the electronic system boots; when the initialization of the second controller has failed, the electronic system enters a preheating mode. In the preheating mode, the first controller controls the power supply unit to continuously provide power to the processor, and a turbo function is enabled by the first controller, so as to provide a heat energy for heating the electronic system. The preheating mode is stopped by the first controller, and the electronic system is rebooted.

The invention provides an electronic system including at least one processor, a power supply unit, a clock generator, at least one first controller, and at least one second controller. The power supply unit is coupled to the processor. The clock generator is coupled to the processor. The first controller is coupled to the power supply unit, and the first controller includes a BIOS. The second controller is coupled to the first controller. The first controller checks whether an initialization of the second controller is successful or not after the electronic system boots; when the initialization of the second controller has failed, the electronic system enters a preheating mode. In the preheating mode, the first controller controls the power supply unit to continuously provide power to the processor, and a turbo function of the processor is enabled by the first controller, so as to provide a heat energy for heating the electronic system. Moreover, the preheating mode is stopped by the first controller, and the electronic system is rebooted.

According to an embodiment of the invention, the processor includes a central processing unit or a graphics processing unit, the first controller is a controller operating the BIOS or a southbridge chip, and the second controller is a northbridge chip or a main memory controller.

According to an embodiment of the invention, the first controller controls the power supply unit to increase a power supply voltage supplied to the processor, or controls the clock generator to increase an operating frequency of the processor, so as to enable the turbo function.

According to an embodiment of the invention, the first controller counts a heating time of the electronic system in the preheating mode; when the heating time reaches a predetermined time, the first controller stops the preheating mode and reboots the electronic system; and after the electronic system is rebooted, the first controller checks again whether the initialization of the second controller is successful or not.

In summary, the invention provides a method for preheating the electronic system when booting in a low temperature environment, and a boot preheating apparatus monitoring whether the initialization of a system chipset has failed during the low temperature booting process. When the initialization of the system chipset has failed, a ramping speed of the electronic system temperature is increased. Moreover, the electronic system is rebooted, so as to effectively decrease the boot wait time needed for heating the electronic system and the system chipset when booting in low temperature.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
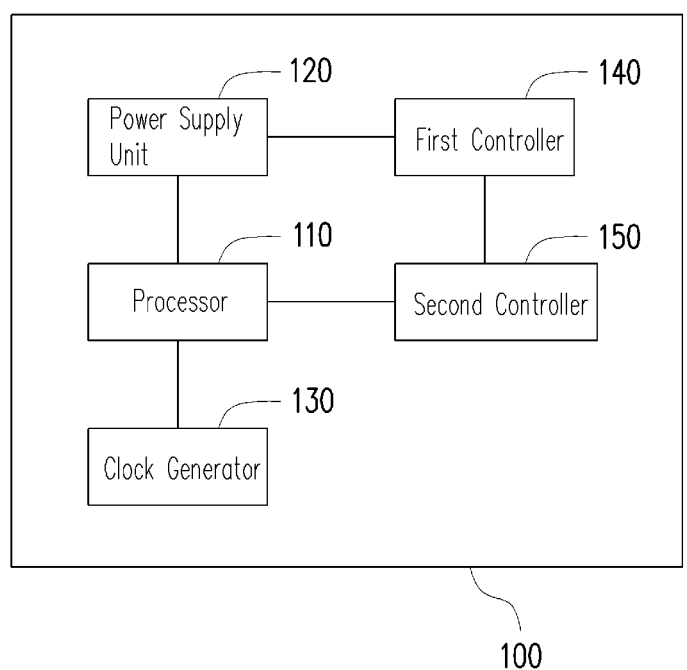
FIG. 1 is a functional block diagram of an electronic system according to an embodiment of the invention.

FIG. 1 is a functional block diagram of an electronic system 100 according to an embodiment of the invention. The electronic system 100 has a boot preheating apparatus, a clock generator 130, and other components. In FIG. 1, the boot preheating apparatus includes a processor 110, a power supply unit 120, a first controller 140, and a second controller 150. In the present embodiment, the processor 110 may include a single system chip or a system chipset such as a central processing unit (CPU) or a graphics processing unit (GPU).

The power supply unit 120 is coupled to the processor 110 to provide power to the processor 110. The clock generator 130 is coupled to the processor 110 to provide a clock signal to the processor 110.

The first controller 140 is coupled to the power supply unit 120. The first controller 140 includes a basic input/output system (BIOS). The first controller 140 may issue management commands to the power supply unit 120, the second controller 150, and the rest of the integrated circuits or peripheral devices (e.g., memory, chipsets, mouse, keyboard, soft/hard disk, or input/output ports) in the electronic system 100 through a bus such as a system management bus (SM-Bus) or a control bus.

In the present embodiment, the first controller 140 may be a controller operating the BIOS, although embodiments of the invention are not limited thereto. In another embodiment of the invention, the first controller 140 may also be a single chip or a chipset, such as a southbridge chip, a keyboard controller, or a microcontroller having similar functions. Besides executing an initialization of the system chip, the single chip or chipsets with these similar functions may also be used to monitor the initializations of the peripheral device chipsets in the electronic system 100.

The second controller 150 is coupled to the first controller 140 to execute the initialization of the system chipset when the electronic system 100 is booting. In the present embodiment, the second controller 150 may be a main memory controller, although embodiments of the invention are not limited thereto. In another embodiment of the invention, the second controller 150 may also be a single chip or a chipset, such as a northbridge chip or a microcontroller having similar functions.

Figure 2:
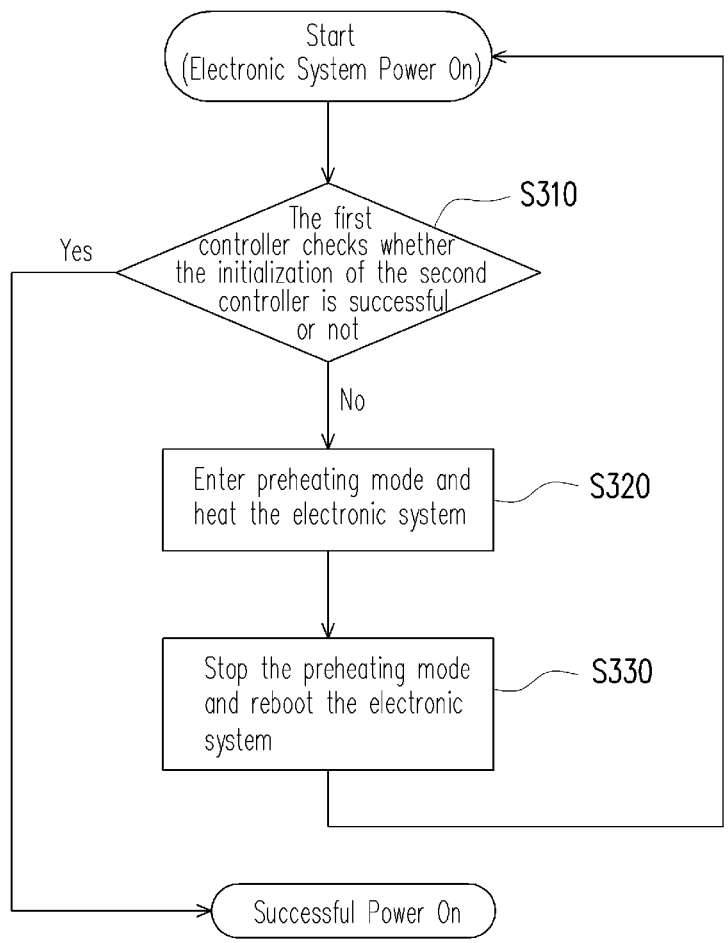
FIG. 2 is a flow chart of a method for preheating an electronic system when booting according to an embodiment of the invention.

FIG. 2 is a flow chart of a method for preheating an electronic system when booting according to an embodiment of the invention. With reference to FIGS. 1 and 2, after the electronic system 100 is powered on in an environment with low temperature, the internal components of the electronic system 100 are sequentially initialized according to a predetermined power sequence. After the second controller 150 is provided with power, the boot preheating apparatus of the electronic system 100 executes a Step S310.

In Step S310, the first controller 140 (e.g. the BIOS) checks/monitors whether the initialization of the second controller 150 (e.g. the chipset or the northbridge chip) is successful or not.

It should be noted that, embodiments of the invention are not limited thereto. In another embodiment of the invention, the first controller 140 may also check whether the initialization of the peripheral devices monitored by the second controller 150 is successful or not. For example, after the second controller 150 issues a command to begin initializing the peripheral devices, the second controller 150 receives and transmits an initialized state of each peripheral device to the first controller 140. The initialized state of the peripheral devices includes information on whether each device has been successfully initialized. According to the initialized states of the peripheral devices transmitted by the second controller 150, the first controller 140 then determines whether the initialization executed by the second controller 150 has been successful.

As mentioned, when the first controller 140 determines that the initialization of the second controller has been successful, the electronic system 100 continues to perform other booting initialization processes and loads an operating system (OS) in order to have a successful boot. When the first controller 140 determines that the initialization of the second controller 150 has failed, the boot preheating apparatus of the electronic system 100 executes a Step S320 following Step 310.

In Step S320, the electronic system 100 enters a preheating mode. In the preheating mode, the processor 110 (e.g. the CPU and/or the GPU) is powered continuously and a turbo function is enabled to provide a heat energy for heating the electronic system 100. For example, the power supply unit 120 continuously provides the processor 110 in the electronic system 100 (or a combination of the processor 110 with other integrated circuits) with power. Accordingly, heat energy is continuously provided to the electronic system 100 by the processor 110 running and generating heat (or heat generated by a combination of the processor 110 and other integrated circuits). The integrated circuits capable of generating heat energy may be a disk interface circuit (e.g. a SCSI/SATA interface card), a network interface card (NIC) or a display circuit (e.g. a video card, display card, graphics card or video adapter).

Furthermore, the first controller 140 increases the power supply voltage inputted to the processor 110 (e.g., increasing a working voltage of the processor 110) by controlling the power supply unit 120, so as to enable the turbo function of the processor 110. The turbo function mentioned above can drastically increase an operating speed of the processor 110, and rapidly and simultaneously generate more heat energy than the processor 110 is capable of generating at a normal operating speed, thereby increasing the temperature of the electronic system 100.

It should be noted that, embodiments of the invention are not limited thereto. In another embodiment of the invention, the first controller 140 may also increase an operating frequency of the processor 110 by ramping up a clock frequency generated by the clock generator 130. Moreover, the processor 110 may also enable the turbo function through the enhanced operating frequency.

After executing Step S320 and a heating period has passed, the boot preheating apparatus of the electronic system 100 then executes a Step S330. In Step S330, the first controller 140 stops the preheating mode and reboots the electronic system 100. For example, the first controller 140 counts a heating time of the electronic system 100 in the preheating mode. When the heating time has reached a predetermined time, the first controller 140 stops the preheating mode and reboots the electronic system 100.

The predetermined time may be determined in accordance with design requirements of an actual product. In the present embodiment, the predetermined time may be a fixed value such as 3 minutes. In another embodiment, an internal temperature of the electronic system 100 may be detected when the electronic system 100 is booted, then the first controller 140 determines the predetermined time according to the internal temperature of the electronic system 100. For example, the predetermined time is 1 minute if the internal temperature of the electronic system 100 is −5° C.; the predetermined time is 2 minutes if the internal temperature of the electronic system 100 is −10° C.; and the predetermined time is 3 minutes if the internal temperature of the electronic system 100 is −15° C. The internal temperature of the electronic system 100 may be a temperature of the second controller 150, or a temperature of a motherboard, or a temperature of other components in the electronic system 100.

Moreover, in the present embodiment, the rebooting of the electronic system 100 after stopping the preheating mode may be executed by the first controller 140 (e.g. the BIOS) controlling the power supply unit 120 to turn off the power of the electronic system 100. After the power of the electronic system 100 is turned off, the first controller 140 controls the power supply unit 120 to provide power for the electronic system 100 again in order to execute the booting operation. After the electronic system 100 has been rebooted, the first controller 140 executes Steps S310-S330 to check again whether the initialization of the second controller 150 is successful or not.

Figure 3:
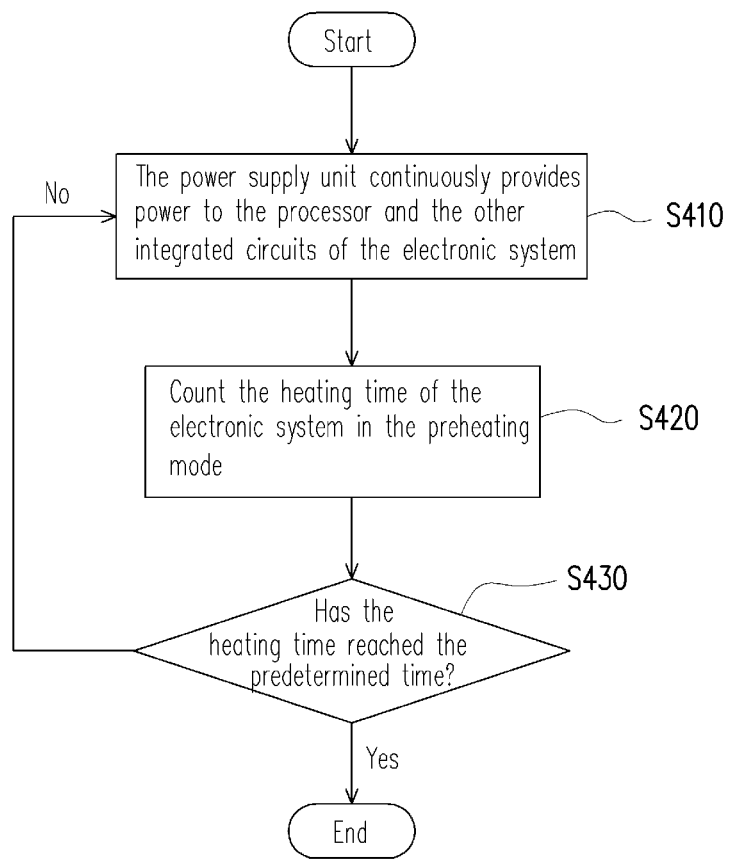
FIG. 3 is a flow chart of a preheating mode according to an embodiment of the invention.

In order to further describe the method for preheating the electronic system when booting in the invention, FIG. 3 is used to further elaborate on the operating details of the preheating mode in the preheating method of the invention. FIG. 3 is a flow chart of a preheating mode according to an embodiment of the invention. With reference to FIGS. 1 and 3, the preheating mode begins at a Step S410.

In Step S410, the power supply unit 120 continually provides power to the processor 110 and other integrated circuits of the electronic system 100. It should be noted that, Step S410 may be referenced to the related description of Step S320 in FIG. 2, and therefore further elaboration thereof is omitted.

In Step S420, the first controller 140 counts the heating time of the electronic system 100 in the preheating mode. For example, when the first controller 140 controls the power supply unit 120 to increase the power supply voltage (e.g. working voltage) provided for the processor 110 (or the processor 110 and other integrated circuits) in the electronic system 100, or the first controller 140 controls the clock generator 130 to increase the operating frequency of the processor 110, a time recorder is enabled. The time recorder is used to record a total time passed after enabling the turbo function, and this total time passed is the heating time. A Step S430 is then executed after Step S420.

In Step S430, the first controller 140 determines whether the heating time has reached the predetermined time or not (e.g. a predetermined heating time of 3 minutes) and generates a determined result. The first controller 140 then determines whether to stop the preheating mode according to the determined result.

Moreover, in order to set the predetermined time, in the present embodiment, the first controller 140 detects the internal temperature of the electronic system 100 when booting. It should be noted that, the internal temperature may include the temperatures of the processor 110, the power supply unit 140, the first controller 140, the second controller 150, or other integrated circuits in the electronic system 100. The first controller 140 then determines the predetermined time according to this internal temperature. For example, if the internal temperature of the electronic system 100 when the electronic system 100 is booting is TE, a lower limit of a normal working temperature of the second controller 150 is TL, and a temperature ramping speed for heating the electronic system 100 by the heat energy generated with the processor 110 is S, then the first controller 140 can derive the predetermined time in the preheating mode by using these parameters (TE, TL, and S) and the formula: (|TL−TE|)/S. For example, when TE is −10° C., TL is 2° C., S is 0.05 degrees/second (i.e. 0.05 degrees of temperature increase per second), then according to the formula above, the predetermined time can be derived to be |TL−TE|/S=|2−(−10)|/0.05=240 seconds. In other words, when entering the preheating mode, the first controller 150 can set the predetermined time to 4 minutes according to this formula, although embodiments of the invention are not limited thereto. In another embodiment of the invention, the first controller 140 may derive the predetermined time of the preheating mode according to other mathematical formulas, or determine the stopping condition of the preheating mode according to other conditions.

Accordingly, after the first controller 140 derives the predetermined time of the preheating mode, the first controller 140 compares the heating time (may be stored in the time recorder) of the time passed when the electronic system 100 entered the preheating mode with the predetermined time, and then generates a comparison result. When the comparison result is that the heating time is shorter than the predetermined time, Step S410 is executed after Step S430. In other words, the temperature of the electronic system 100 is continuously increased. On the other hand, when the comparison result is that the heating time is equal to or longer than the predetermined time, then after Step S430, the first controller 140 stops heating the electronic system 100, and the preheating mode ends.

It should be appreciated that, embodiments of the invention are not limited thereto. In another embodiment of the invention, the first controller 140 may also determine whether to stop the preheating mode by the first controller 140 to detect the internal temperature of the electronic system 100 through a corresponding temperature detector, and using this internal temperature to determine whether to stop the preheating mode. For example, the first controller 140 detects the internal temperature TE of the electronic system 100 many times while the electronic system 100 is in the preheating mode. When the internal temperature TE reaches the predetermined temperature (e.g. the lower limit TL of the normal working temperature of the second controller 150), the first controller 140 stops the preheating mode and reboots the electronic system 100. When the internal temperature has not reached the predetermined temperature, the preheating mode is continuously maintained to increase the temperature of the electronic system 100.

In view of the foregoing, embodiments of the invention provide a method for preheating the electronic system 100 when booting in an environment with low temperature, and a boot preheating apparatus. The first controller 140 monitors whether the initialization of the second controller 150 is successful or not in the low temperature booting process. Once the initialization of the second controller 150 has failed, the turbo function of the processor 110 is enabled to increase the temperature of the second controller 150. The electronic system 100 is then rebooted, so as to effectively decrease the boot wait time needed for heating the electronic system and system chipsets when booting in low temperature.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for preheating an electronic system when booting in an environment with low temperature, the electronic system comprising at least a processor, at least a first controller, and at least a second controller, the method comprising:
   the first controller checking whether an initialization of the second controller is successful or not after the electronic system boots, the first controller comprising a basic input/output system (BIOS);
   entering a preheating mode when the initialization of the second controller has failed, wherein the processor is powered continuously and a turbo function of the processor is enabled in the preheating mode, so as to provide a heat energy for heating the electronic system; and
   stopping the preheating mode and rebooting the electronic system.

2. The method for preheating the electronic system as claimed in claim 1, wherein in the preheating mode, the processor and the other integrated circuits of the electronic system are continuously provided with power, so as to provide the heat energy for heating the electronic system.

3. The method for preheating the electronic system as claimed in claim 1, wherein the processor comprises a central processing unit or a graphics processing unit.

4. The method for preheating the electronic system as claimed in claim 1, wherein the first controller is a controller operating the BIOS or a southbridge chip, and the second controller is a northbridge chip or a main memory controller.

5. The method for preheating the electronic system as claimed in claim 1, wherein the first controller is a keyboard controller, and the second controller is a chipset.

6. The method for preheating the electronic system as claimed in claim 1, wherein the first controller increases a power supply voltage supplied to the processor or an operating frequency of the processor, so as to enable the turbo function.

7. The method for preheating the electronic system as claimed in claim 1, wherein the step of stopping the preheating mode comprises:
   counting a heating time of the electronic system in the preheating mode; and
   the first controller ending the preheating mode and restarting the electronic system when the heating time reaches a predetermined time.

8. The method for preheating the electronic system as claimed in claim 7, wherein the step of stopping the preheating mode further comprises:
   detecting an internal temperature of the electronic system when booting; and
   determining the predetermined time according to the internal temperature.

9. The method for preheating the electronic system as claimed in claim 8, wherein the internal temperature comprises a temperature of the second controller.

10. The method for preheating the electronic system as claimed in claim 9, wherein if the internal temperature when the electronic system is booting is TE, a lower limit of a normal working temperature of the second controller is TL, and a temperature ramping speed for heating the electronic system is S, then predetermined time is (|TL−TE|)/S.

11. The method for preheating the electronic system as claimed in claim 1, wherein the step of stopping the preheating mode comprises:
   detecting an internal temperature of the electronic system; and
   the first controller ending the preheating mode and restarting the electronic system when the internal temperature reaches a predetermined temperature.

12. The method for preheating the electronic system as claimed in claim 1, wherein the step of restarting the electronic system comprises:
   turning off the power of the electronic system;
   providing power to the electronic system again; and
   the first controller checking again whether the initialization of the second controller is successful or not after the electronic system has been rebooted.

13. A boot preheating apparatus of an electronic system in an environment with low temperature, comprising:
   at least a processor;
   a power supply unit coupled to the processor;
   at least a first controller coupled to the power supply unit, the first controller comprising a BIOS; and
   at least a second controller coupled to the first controller;
   wherein the first controller checks whether an initialization of the second controller is successful or not after the electronic system boots; when the initialization of the second controller has failed, the electronic system enters a preheating mode;
   wherein in the preheating mode, the first controller controls the power supply unit to continuously provide power for the processor, and a turbo function of the processor is enabled by the first controller so as to provide a heat energy for heating the electronic system; and the preheating mode is stopped by the first controller and the electronic system is rebooted.

14. The boot preheating apparatus of the electronic system as claimed in claim 13, wherein the processor comprises a central processing unit or a graphics processing unit, the first controller is a controller operating the BIOS or a southbridge chip, and the second controller is a northbridge chip or a main memory controller.

15. The boot preheating apparatus of the electronic system as claimed in claim 13, wherein the first controller controls the power supply unit to increase a power supply voltage supplied to the processor, or controls a clock generator of the electronic system to increase an operating frequency of the processor, so as to enable the turbo function.

16. The boot preheating apparatus of the electronic system as claimed in claim 13, wherein the first controller counts a heating time of the electronic system in the preheating mode; when the heating time reaches a predetermined time, the first controller stops the preheating mode and reboots the electronic system; and after the electronic system is rebooted, the first controller checks again whether the initialization of the second controller is successful or not.

17. An electronic system, comprising:
   at least a processor;
   a power supply unit coupled to the processor;
   a clock generator coupled to the processor;
   at least a first controller coupled to the power supply unit, wherein the first controller comprising a BIOS; and
   at least a second controller coupled to the first controller;
   wherein the first controller checks whether an initialization of the second controller is successful or not after the electronic system boots; when the initialization of the second controller has failed, the electronic system enters a preheating mode;
   wherein in the preheating mode, the first controller controls the power supply unit to continuously provide power for the processor, and a turbo function of the processor is enabled by the first controller, so as to provide a heat energy for heating the electronic system; and the preheating mode is stopped by the first controller, and the electronic system is rebooted.

18. The electronic system as claimed in claim 17, wherein the processor comprises a central processing unit or a graphics processing unit, the first controller is a controller operating the BIOS or a southbridge chip, and the second controller is a northbridge chip or a main memory controller.

19. The electronic system as claimed in claim 17, wherein the first controller controls the power supply unit to increase a power supply voltage supplied to the processor, or controls the clock generator of the electronic system to increase an operating frequency of the processor, so as to enable the turbo function.

20. The electronic system as claimed in claim 17, wherein the first controller counts a heating time of the electronic system in the preheating mode; when the heating time reaches a predetermined time, the first controller stops the preheating mode and reboots the electronic system; and after the electronic system is rebooted, the first controller checks again whether the initialization of the second controller is successful or not.

* * * * *